United States Patent [19]

Henochowicz et al.

[11] Patent Number: 5,252,811
[45] Date of Patent: Oct. 12, 1993

[54] DEVICE, SYSTEM AND METHOD FOR INCREASING SAVING ACCOUNT PARTICIPATION AND INVESTMENT BY SMALL INVESTORS

[75] Inventors: Lucien Henochowicz, Los Angeles, Calif.; James E. Humphrey, Dallas, Tex.

[73] Assignee: U.S.A. Save Corporation, Dallas, Tex.

[21] Appl. No.: 743,266

[22] Filed: Aug. 9, 1991

[51] Int. Cl.$^5$ ............................................. G06F 15/30
[52] U.S. Cl. ..................................... 235/379; 902/24
[58] Field of Search .......................... 235/379; 902/24; 364/408

[56] References Cited

U.S. PATENT DOCUMENTS

| | | | |
|---|---|---|---|
| 4,621,326 | 11/1986 | Rowlins | 235/379 |
| 4,689,978 | 8/1987 | Hale et al. | 902/24 |
| 4,988,849 | 1/1991 | Sasaki et al. | 902/24 |
| 5,025,372 | 6/1991 | Burton et al. | 364/408 |
| 5,117,355 | 5/1992 | McCarthy | 364/408 |

Primary Examiner—Harold Pitts
Attorney, Agent, or Firm—John W. Montgomery

[57] ABSTRACT

An automated cash saving system including multiple remote cash saving machines for automatically receiving deposited cash in small amounts from multiple depositors, for automatically counting the cash deposited by each of the depositors, and for attributing the value of accounted cash to individual savings accounts identified by the depositors, and for electronically encoding the values and the accounts to which the cash is attributed; transmitters to multiple remote transmitters associated with the multiple remote cash saving machines for sending the electronically encoded information to a central processor for decoding, an automatic processor in the central processor wherein the identified accounts, the lock box at the multiple remote cash savings machines for holding deposited cash until it can be physically collected, and an authorization letter generating device associated with the central processor for obtaining the depositor's authorization to purchase preselected instruments on his behalf upon reaching a cumulative value in the depositor's savings account equal to or greater than the minimum purchase price of the preselected security instrument.

10 Claims, 3 Drawing Sheets

DEVICE, SYSTEM AND METHOD FOR INCREASING SAVING ACCOUNT PARTICIPATION AND INVESTMENT BY SMALL INVESTORS

BACKGROUND OF THE INVENTION

The present invention relates to a system method, device and apparatus for encouraging the participation of small investors in savings accounts and investment accounts, particularly, this invention relates to coin and currency counting bank machines at which small amounts of coins and paper currency can be deposited for collection and for automatic accounting, recordation of deposited amount, periodic collection and investment in interest-bearing savings accounts or bonds on behalf of the small investor/depositor.

Coins and other small denomination currency are collected in numerous households in jars, piggy banks, drawers, coin trays and the like, which money is seldom collected, counted and placed in savings institutions or investment securities. These small denominations are often in the hands of young people, and the amount is not independently sufficient to provide for the purchase of a savings bond, or a quantity of stocks, or other investment vehicle. Often, the minimum required even for opening a savings account can be significantly larger than the amount of money in these small stashes of coin and low denomination currency.

There are devices into which coins can be fed for separating and organizing the coins into separate denominations by sizes. There are also devices for optically scanning the small denomination currency, in particular one dollar bills, as in various vending machines and the like. In many instances, these sorting and money counting machines are highly reliable and provide a quick, accurate count of the amount of money. For example, coin collection machines at toll booths for toll roads and the like rapidly collect coins and evaluate the value thereof. Such devices have heretofore been utilized only for the purpose of providing goods (as in a vending machine) or services (as in the use of a toll road) in exchange for the money deposited.

There are also ordinary bank accounts into which depositors can place their money, but the deposit of coins and small amounts of money is typically discouraged by the bank tellers, and the human time required to count the value of the coins or small denominations.

SUMMARY OF THE INVENTION

The present invention provides collection devices into which coins and small denominations can be conveniently deposited. The machines automatically sort coins and count the money deposited and provide the depositor with a printed receipt indicating the value of the coins deposited. The information is communicated to a central processing station and the coins deposited are periodically collected from the receptacle and taken to a bank for credit and recirculation of the currency. Each depositor establishes an account, as by a Social Security number or a driver's license number or other such individualized identifier and as each deposit is made, the depositor's account is credited with each additional amount of money deposited. When the total amount deposited over a period of time reaches a threshold level, such as the threshold level for purchasing a U.S. Savings Bond or other designated security instrument, the depositor is notified of his option to have such a security instrument purchased on his behalf and the operator of the network purchases such a security in the depositor's name and forwards it to him.

BRIEF DESCRIPTION OF THE DRAWINGS

The foregoing objects and advantages can be more fully understood with reference to the drawings in which like elements are represented by like numerals, and in which.

DETAILED DESCRIPTION OF THE INVENTION

Figure 1:
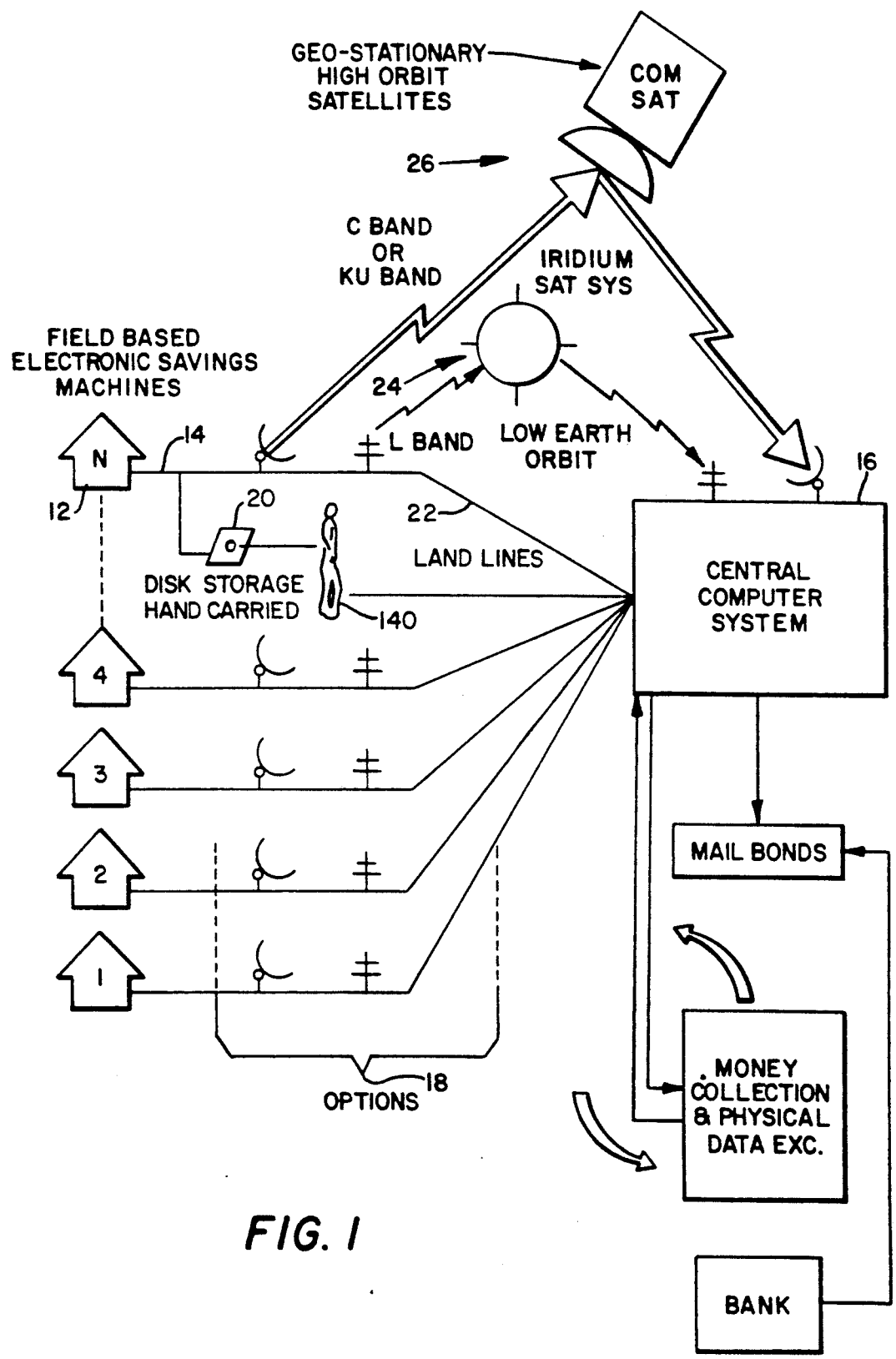
FIG. 1 is a schematic depiction of the inventive, automated cash saving system.

With reference to FIG. 1, which is a schematic depiction of the inventive, automated cash saving system 10 in which multiple electronic field-based saving machines 12 are schematically depicted, numbering 1, 2, 3, 4 . . . N, with each electronic machine 12 providing similar automatic cash collection and information gathering and transmission function, as will be described more fully below with reference to FIGS. 2 and 3.

The information collected by the machine is represented by data line 14. Basically, this information will include information on the amount of money deposited, the identification of the depositor, or the depositor's account to which the deposit is to be credited. Other information, such as location of the machine, date and time, can also be included within the information collected, schematically represented as data line 14. This information will, according to the invention, be transmitted to a central computer system 16 through one or more optional transmission means 18. Such optional transmission means may include the physical transmission or the physical carrying of a data computer storage disk for a low-end or low-cost electronic savings machine which may be established in location where low traffic might be expected, but nevertheless is helpful for convenient access for the types of small investors for which the system is designed. Land lines 22 might also be used to transmit data. Other transmission means, including low orbit satellite transmission 24, such as a iridium SAT system, or even a high orbit satellite 26, such as a geostationary satellite as a COMSAT satellite system.

The money collection function 28, schematically represented by box 28, would be done, for example, by a courier 30, which courier 30 would also collect the data disk from electronic savings machines in which more sophisticated radio or satellite transmission systems could not be economically justified based upon the volume of collections being made at any such field-based electronic savings machines. To the extent that hard currency or bills were collected, they would be deposited, as for example by multiple couriers each having separate collection routes, to a money collection and physical data exchange location 28 at which money collection and physical data exchange location the appropriate information on the amounts collected as well as the data as to the depositors could be forwarded to the central computer system. The money collection expected to be handled at money collection station 28 would be on an area-by-area basis, each of which areas could be serviced by multiple field-based electronic savings machines. Each money collection site would also have access to banks for depositing the hard currency into the Federal Banking System. The central computer would receive all input information and would track the amount of money being deposited by each depositor or with respect to each particular identified account. The central computer system would conduct various steps with the information collected, including running a continuous tally or total of the investments having been made over a period of time by each independent depositor. Various types of securities or a minimum investment amount would be determined and advise, as by a letter notice to a depositor, would be generated at a threshold level for the particular security or investment device for which the system is anticipated. Upon receipt of authorization from the depositor, an order would be placed for the purchase of a security or other investment instrument and the security or investment instrument would then be forwarded to the individual depositor.

Figure 2:
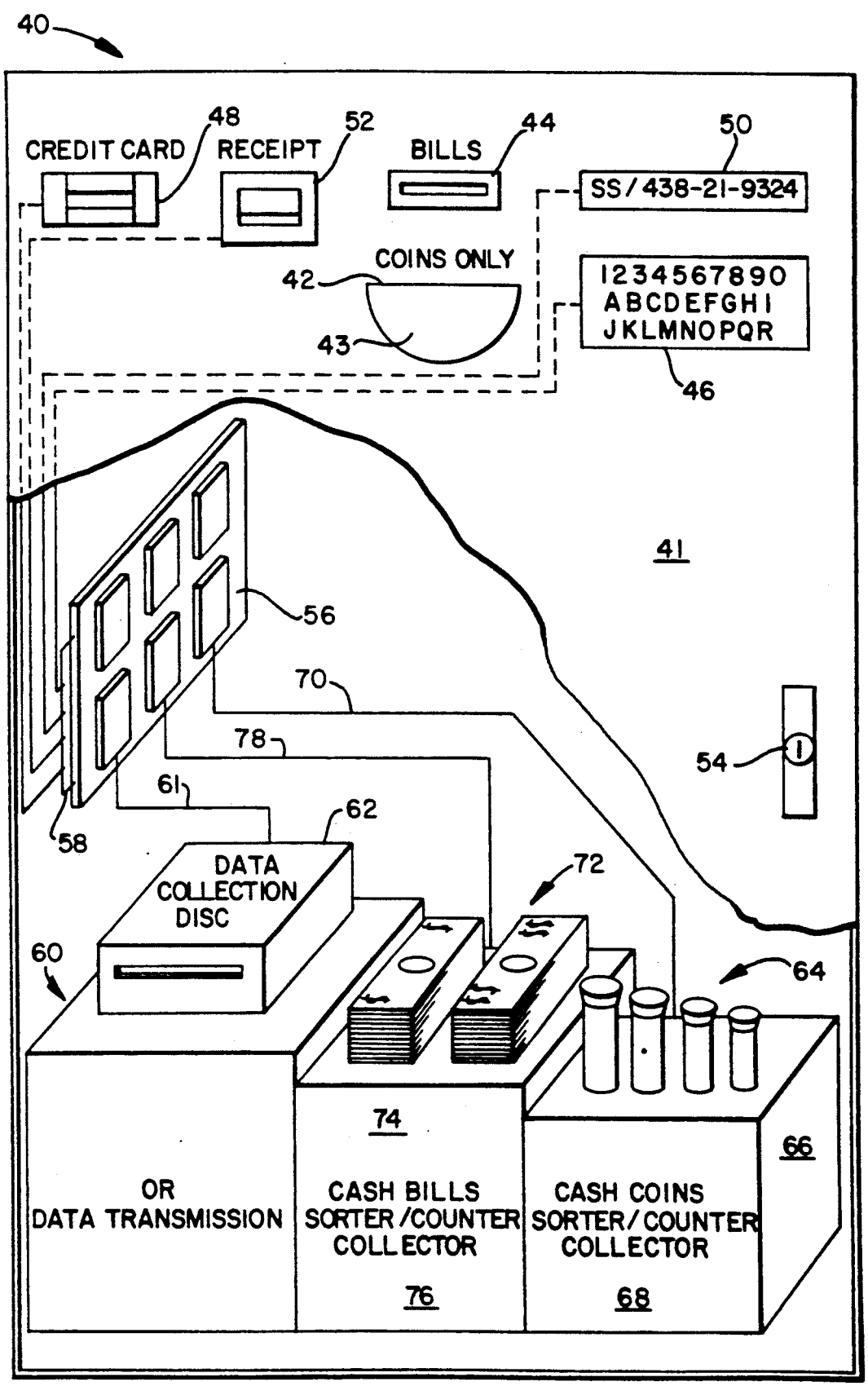
FIG. 2 is a front plan view, with a partial cutaway and schematic depiction of internal components of the automated electronic saving machine of the inventive system.

With reference to FIG. 2, which is a front plan view with a partial cutaway showing the schematic depiction of internal components of an automated electronic savings machine 40. On the exterior face of the machine at convenient locations which are depicted schematically for the purpose of discussions here, a cash/coin depository 42 is provided which may include a large receptacle having a funneling device so that the coins can be easily received into the cash collection machine for further processing. Also, a cash bill depository 44 would be provided by which bills of various denominations, including one dollar bills, could be inserted into the electronic cash collection machine. An identification means, such as an identification keypad 46, or an identification card input 48, which may be of the type designed for accepting electronic credit cards or magnetic strip type credit cards used to identify the depositor or the account to which money being deposited is to be credited. To confirm the identification prior to depositing the money, an identification display means 50 would be provided, such as a liquid crystal display (LCD), or other acceptable display. For example, a cathode ray tube (CRT) screen might be used. It is expected that the size and cost advantages currently provided by a LCD display make the LCD display the preferred embodiment. Also, to give the savers a comfort level and also a check against the electronic data transmission, a deposit receipt generator 52 could be conveniently provided.

The electronic cash collection machine 40 will be provided with a locked collection access means 54, schematically depicted as a key lock, it being understood that other security locking devices may also be employed, as may be appropriate for retrieving the deposited cash from the cash collection machine.

Each of the information input machines, including keypad 46 and credit card reader 48 will communicate with an onsite information processor 56, as for example via communication lines 47 and 49, respectively. Information processor 56 will also communicate to output information means including the identification display 50 via line 51 and receipt generator 52 via information transmission line 53.

The onsite information processor 56 may be a small microprocessor or may, for example, as shown schematically be a plug-in computer card 58. The circuitry inside the cash collection machine would also transmit the data from the onsite information processor via internal communication line 61 to a data transmission means 60, which data transmission means 60 may be any of the optional for generating a transmission signal compatible with any of the data transmission options 18, as in FIG. 1. In the case of the low-end data collection means which is preferred for low traffic areas in which, for the convenience of the individual savers, inexpensive, no-frills collection means are provided, a data collection means 62, such as a magnetic computer disk drive to which the information processor can feed the data which is to be transmitted to the central computer system 16 (as shown in FIG. 1). Upon deposit of cash in either the form of coins into coin receptacle 42, or in the form of dollar bills or bills of other denominations in bill collector 44, additional information is generated internally and received for processing by the information processor and for subsequent data transmission. In the case of cash coins deposited, a coin sorter 64 receives the coins to sort them into various coin denominations and the coins are counted with coin counter 66. The coins, thus sorted and counted, will be collected in coin collection means 68 and the electronic coin value information from the coin counter 66 be transmitted to the information processor via information line 70.

In the case of the bills deposited in bill receiver 44, the bills will be sorted at bill sorter 72, which is operably connected to bill counter 74 so that they can subsequently be collected in the collection means 76. The electronic information indicating the value of the bills so deposited would be transmitted via communication line 78 to the information processor. The processor would coordinate the information regarding the amount and value of the coins and/or bills collected and would transmit this information via information line 61 for subsequent data transmission at data transmission means 60.

Figure 3:
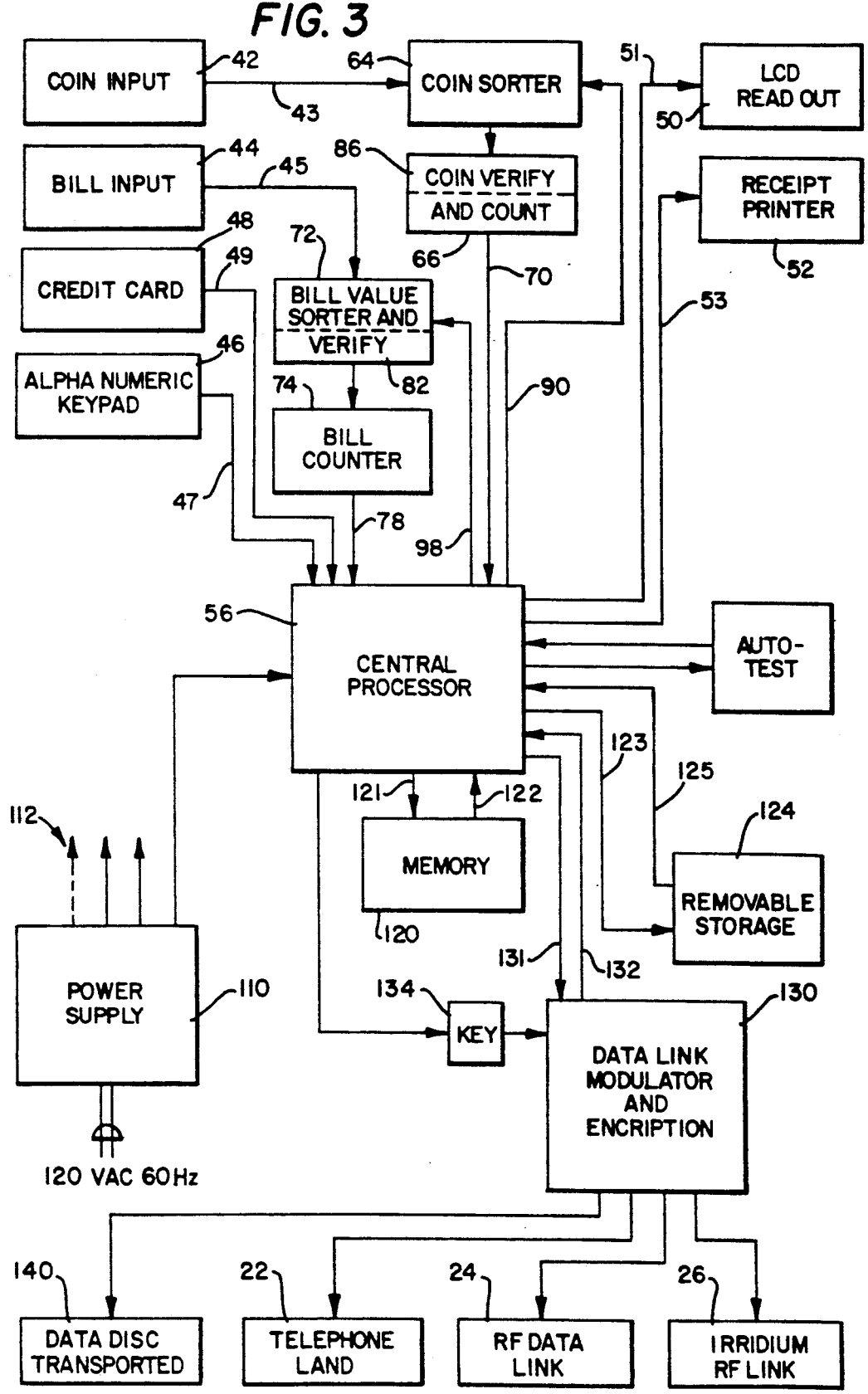
FIG. 3 is a schematic block diagram of the field-based electronic savings machine.

Further understanding of the invention can be had with reference to FIG. 3, which is a schematic block diagram of the electronic savings machine of FIG. 2, showing the various lines of communication with the onsite processor 56, in which the coin input 42 provides coin to coin sorter 64 and from coin sorter 64 to coin counter 66, which may also include verification means for verifying the coin count 86. The information is provided to the onsite processor via coin data line 70, updated information regarding coin sorting and counting can be provided to the mechanical coin sorter 64 or the coin counter 66 or coin verifier 86 via update information line 90.

The bill input 44 provides information to the bill sorter 72, which provides further information to the bill counter 74. This information is provided to the onsite processor 66 via communication line 78. Updated information can be provided from the onsite processor 56 to the coin sorter, verifier or counter through feedback line 98.

With reference to FIG. 3, it can also be seen that identification means, such as credit card identification input 48 or alphanumeric keypad 46 provide information to the onsite processor 56 along information transmission line 49 with respect to credit card input 48 or along information transmission line 47 with respect to alphanumeric keypad 46. Both input identifiers can be used and, in the preferred embodiment, both would be available for the convenience of the depositor. However, other identifier input means as might be equivalent could also be used, which provide accurate and easy input of depositor's identification or account identification.

The processor would be powered by a power supply 110, which may, for example be a standard 120 volts AC power supply connection. Other alternative power supplies at remote locations or in foreign countries might also be provided. The power supply would power all of the devices, including the onsite processor and the various coin input, bill input, credit card read and alphanumeric keypads. Further, the LCD readout 50, which receives its information for presenting the readout along communication line 51 would be powered with the connections to the power supply. Also, the receipt printer 52, which receives data for printing out the receipt along data line 53 will be appropriately powered, as required, from the power supply. Individual connections to each required power device are designated schematically with arrows 112.

In the preferred embodiment, the onsite processor 56 is provided with memory 120 with memory communication lines 121 and 122 for the interchange of information with the onsite processor 56. Additional memory storage is in the form of a removable storage 124. This removable storage 124 communicates with the onsite processor 56 via communication lines 123 and 125. The removable storage advantageously provides means for conveniently updating the onsite processor memory or storage or processes and may also be used to collect certain designated information for transport back to the central processor. A data link modulator and encryption means 130 receives and communicates information along lines 131 and 132 with the onsite processor. The type of modulation and encryption to be performed by device 133 at any given electronic savings machine location can be programmed from the onsite processor via a key 134. The information required for such a key may be periodically input to the onsite processor via the removable storage memory 124.

As the data link modulator and encryption means 130 is designed for encrypting the information from the onsite processor in various formats according to the key 134, some of the various formats are depicted, each having its own advantage in a particular electronic savings machine environment. For example, a data disk device 140 may require the receipt of information in standard ASCII or other computer language format or other computer language magnetic recordation for input onto magnetic storage disks. These data storage disks could then be collected and carried to the central computer system to a physical data exchange for input into the central computer system.

Alternatively, telephone land line system 142 may be employed in which the information is converted into tones, as by a modem for transmission over telephone land lines. The data link modulator 131 may also be programmed to encrypt the information for transmission via radio frequency data link, such as a geostationary high orbit satellite system 144. Further, the information may be transmitted via an iridium radio frequency link 146, where such low orbit satellite systems might be conveniently available.

While the invention has been disclosed with respect to certain preferred embodiments, the disclosure is not intended to be limited to those embodiments but, to the contrary, is intended to cover such equivalent methods, systems and devices as may be covered within the scope of the claims.

What is claimed is:

1. An automated electronic cash saving system for encouraging savings by periodic depositors of small cash amounts, said system comprising:
   (a) means at a plurality of remote local sites for determining the identification of a saving account for a periodic depositor of small cash amounts in the form of coins, bills, or both;
   (b) means for receiving cash deposited at said plurality of remote local sites in the form of bills and in the form of coins for said identified depositor savings account;
   (c) means for determining value of cash deposited whether coins, bills or both for said identified small depositor savings account;
   (d) a central computer processor;
   (e) means for electronically transmitting said savings account identification and the value of cash deposited at said remote local sites, from said local sites to said central computer processor;
   (f) means in said central processor for calculating the accumulated sum for the value of cash deposited in said identified savings account;
   (g) means for notifying said savings account depositor when said accumulated sum reaches a minimum amount corresponding to the cost of purchasing a selected security instrument;
   (h) means for purchasing said selected security instrument on behalf of said small depositor; and
   (i) means for reducing the accumulated sum in said identified savings account by the cost of purchasing said selected security instrument on behalf of said small depositor.

2. An automated electronic cash saving system as in claim 1, wherein said means for determining the identification for a periodic depositor comprises:
   (a) local computer processor circuitry;
   (b) an identification code input device, operatively associated with said local computer processor circuitry; and
   (c) a readout device operatively interconnected with said identification input device to allow the depositor to confirm the input identification code by human sensory perception.

3. An automated electronic cash saving system as in claim 1, wherein said means for determining the identification of the periodic depositor comprises:
   (a) local computer processor circuitry;
   (b) alphanumeric keypad operatively associated with said computer processor circuitry;
   (c) a magnetic card reader operatively associated with said local computer processor circuitry; and
   (d) a liquid crystal display device operatively interconnected with said alphanumeric keypad and magnetic card reader to allow the depositor to confirm the input identification code visually.

4. An automated cash saving system as in claim 1, wherein said means for receiving cash comprises:
   (a) a coin receptacle; and
   (b) a dollar bill receptacle.

5. An automated electronic cash saving device as in claim 4, wherein said means for determining the value of said cash deposited comprises:
   (a) a coin sorter operatively associated with said coin receptacle;

(b) a coin counter operatively associated with said coin sorter;
(c) a bill sorter operatively associated with said bill receptacle; and
(d) a bill counter operatively associated with said bill sorter.

6. An automated electronic cash saving system, as in claim 1, wherein said means for electronically transmitting said savings account information and the value of cash deposited to said central processor comprises:
   (a) local computer processing circuitry operatively associated with said means for determining the value of cash deposited and said means for determining the identification of said small depositor savings account;
   (b) a magnetic computer disk drive operatively associated with said computer processing circuitry for magnetically recording said identification and value; and
   (c) a computer disk drive reader at said central processor for reading said identification and cash value from computer disk carried from said local computer processor circuitry.

7. An automated electronic cash saving system as in claim 1, wherein said means for electronic transmission of depositor ID and value of deposit to said central processor comprises:
   (a) a local computer processing circuitry, operatively associated with said means for identification of the depositor's account and said means for determining the value of the deposited cash;
   (b) a telephone line modem operatively associated with said local computer processing circuitry for transmitting data from said local computer processing circuitry; and
   (c) telephone line modem at said central computer processor for receiving telephone line transmissions from said local telephone line modems.

8. An automated electronic cash saving system as in claim 1, wherein said means for electronically transmitting said savings account identification and the value of cash deposited comprises:
   (a) local computer processing circuitry operatively associated with said means for determining the identification of the depositor's account and means for determining the value of the cash;
   (b) a radio frequency signal encoder operatively associated with said local computer processing circuitry;
   (c) a radio frequency signal transmitter for transmitting said encoded radio frequency signal to the central processor; and
   (d) a radio frequency receiver at said central processor.

9. An automated electronic cash saving system as in claim 1, wherein said means for electronically transmitting said savings account identification and value of cash deposited to said central processor comprises:
   (a) local computer processing circuitry operatively associated with said means for determining the identification of the depositor's account and means for determining the value of the cash;
   (b) a radio frequency signal encoder operatively associated with said local computer processing circuitry;
   (c) satellite transmission antenna for transmitting a radio frequency signal to a low orbit satellite system;
   (d) a low orbit satellite system for conveying said transmitted satellite transmission signal to said central processor; and
   (e) a low orbit satellite transmission receiving antenna connected to said central processor.

10. An automated electronic cash saving system as in claim 1, wherein said means for electronically transmitting data to said central processor further comprises:
   (a) local computer processing circuitry operatively associated with said means for determining the identification of the depositor's account and means for determining the value of the cash;
   (b) a radio frequency signal encoder operatively associated with said local computer processing circuitry;
   (c) a high orbit satellite signal transmitter;
   (d) a high orbit geostable satellite for transmitting signals; and
   (e) satellite receiving antenna connected to said central processor for receiving high orbit transmissions from geostable satellite.

* * * * *